US005774720A

United States Patent [19]
Borgendale et al.

[11] Patent Number: 5,774,720
[45] Date of Patent: *Jun. 30, 1998

[54] PERSONALITY NEUTRAL GRAPHICS SUBSYSTEM

[75] Inventors: Kenneth W. Borgendale; Ian Michael Holland; Kelvin Roberick Lawrence, all of Boca Raton; Colin Victor Powell, Highland Beach, all of Fla.; Richard Lee Verburg, Austin, Tex.

[73] Assignee: International Business Machines Corporation, Armonk, N.Y.

[ * ] Notice: The term of this patent shall not extend beyond the expiration date of Pat. No. 5,767,849.

[21] Appl. No.: 516,578

[22] Filed: Aug. 18, 1995

[51] Int. Cl.$^6$ ................................................. G06F 15/163
[52] U.S. Cl. ........................... 395/682; 345/502; 345/520
[58] Field of Search ............................. 395/682; 345/502, 345/520

[56] References Cited

U.S. PATENT DOCUMENTS

| | | | |
|---|---|---|---|
| 4,700,320 | 10/1987 | Kapur | 345/344 |
| 5,083,262 | 1/1992 | Haff, Jr. | 395/500 |
| 5,204,947 | 4/1993 | Bernstein et al. | 345/357 |
| 5,265,206 | 11/1993 | Shackelford et al. | 395/683 |
| 5,265,252 | 11/1993 | Rawson, III et al. | 395/681 |
| 5,274,819 | 12/1993 | Blomfield-Brown | 395/670 |
| 5,291,585 | 3/1994 | Sato et al. | 395/500 |
| 5,297,249 | 3/1994 | Bernstein et al. | 345/356 |
| 5,301,270 | 4/1994 | Steinberg et al. | 345/326 |
| 5,390,314 | 2/1995 | Swanson | 305/705 |
| 5,438,659 | 8/1995 | Notess et al. | 395/155 |
| 5,596,702 | 1/1997 | Stucka et al. | 395/340 |

FOREIGN PATENT DOCUMENTS

603095A2  6/1994  European Pat. Off. ......... G06F 9/44

OTHER PUBLICATIONS

Phelan et al, "An OS/2 Personality on Mach", Proceedings of USENIX Mach III Symposium, pp. 191–201, Apr., 1993.
IBM Technical Disclosure Bulletin, vol. 36, No. 12, pp. 169–171, Dec., 1993; J.A. Cook and R. L. Verburg, "Graphics Adapter Programming Interface With Separable Device Drivers".
UMI Article Clearinghouse, pp. 11–40, Andrew Schulman and Ray Valdes, "Porting Apple Macintosdh Applications to the Microsoft Windows Environment".
IBM Technical Disclosure Bulletin, vol. 30, No. 4, p. 1617, Sep. 1987, G. M. Beauregard, K.E. and A. Wilson, "Device–Independent Soft Copy To Hard Copy Support".

*Primary Examiner*—Alvin E. Oberley
*Assistant Examiner*—Patricia G. Caldwell
*Attorney, Agent, or Firm*—Mark S. Walker; Jack V. Musgrove; Andrew J. Dillon

[57] ABSTRACT

A graphics management system resident in a computer operating system provides a generic graphics interface which allows application programs written to operate with various specific graphical user interfaces, to operate on a non-native graphical user interface. The graphics management system includes a common graphical user interface (GUI) which receives graphics related application programming interface (API) calls from the application programs, and transforms the various types of graphics API calls native to a particular GUI, into a generic format compatible with a personality neutral graphics engine. The personality neutral calls are then passed from the CGUI to the personality neutral graphics engine which services the calls, and controls the drawing of lines, circles and other drawing tasks for each of the windows presented on the display. The present invention allows users to "port" application programs written for one GUI, to a computer system operating a different GUI.

17 Claims, 4 Drawing Sheets

PERSONALITY NEUTRAL GRAPHICS SUBSYSTEM

TECHNICAL FIELD

The present invention relates to computer graphics, and in particular to a personality neutral graphics subsystem which supports the graphics needs for a computer system which runs programs written for several different types of graphical user interfaces on the same desktop.

BACKGROUND OF THE INVENTION

The past decade was a revolutionary time in computing. The advent and proliferation of personal computers has transformed the computer environment from one of large mainframe computer systems which was highly centralized and tightly controlled, to a network of interconnected personal computers and workstations which are often widely distributed yet easily accessible via computer networking.

Concomitant with this change in computer environments is the significant change in the way a user interfaces with the computer. In the past, the display of information on the screen was primarily alphanumeric. In addition, commands such as operating system commands (e.g., DOS commands) were input through a keyboard to control the computer. These commands were often archaic and difficult for users to understand and work with, particularly nontechnical users, without first investing significant amounts of time to learn the commands.

A revolution in computing occurred when the graphical user interface (GUI) was introduced. This user interface is displayed on the monitor to the user, and as its name suggests, is primarily graphics oriented. Rather than typing commands into the computer via a command line, the GUI allows users to control the operation of the computer via the manipulation of icons and dialog boxes displayed on the monitor within a region referred to as a "window." Each icon represents a functional task which the user can select for execution by simply clicking on the icon. The term "window" is well known in the art, and is generally a rectangular region on a computer display, which receives user inputs and displays output.

GUIs generally include a window management system which creates, destroys, minimizes and maximizes windows on the display screen, places the control bars (e.g., a scroll bar) and title bars, and controls the Z-ordering and clipping of the various windows on the display screen. The window manager creates a window in response to a request from an application program, and allocates a region on the display for the window the application program can use to present information on the display. Often times, the display of the computer system having a plurality of windows is referred to as a "desktop" with each window seemingly representing a piece to paper lying on the desktop.

To draw within a window, GUIs generally also include a graphics engine which draws lines, circles, points, and generally controls how data is presented on the display.

The first personal computer to gain widespread commercial acceptance for the GUI was the Macintosh® personal computer by Apple Computer, Inc.

Based upon the popularity of the GUI for the Macintosh and its obvious advantages such as its user friendly nature, GUIs quickly gained widespread acceptance.

Software developers for IBM compatible personal computers also introduced GUI products. The first widely used GUI for IBM compatible personal computers (hereinafter "PCS") was WINDOWS™ developed by Microsoft Corporation (MS). WINDOWS runs on top of the DOS operating system and provides a "shell" (i.e., an interface) between the application program user and the operating system which allows a user to control the execution of an application program(s) by pointing and clicking with a pointer device (e.g., a mouse or trackball) on the screen. Due to the market acceptance of the WINDOWS GUI, application program vendors moved quickly to introduce products into the market which operated with the WINDOWS GUI. IBM also introduced a new operating system known as OS/2® which included its own GUI referred to as PRESENTATION MANAGER™. In order to use OS/2 and its GUI PRESENTATION MANAGER, application program vendors had to update their products to operate with PRESENTATION MANAGER so the application program could display information on the screen.

As different GUIs entered the market, compatibility became a problem since each GUI had its own application programming interface (API), and its own functions an application program would call to interface with the GUI. The API calls generally fall into two categories 1) windows related, and 2) graphics related. With a GUI, the application program no longer has direct control over the display; the application program simply passes information and commands to the GUI via API calls, and the GUI issues the necessary commands to a graphics engine to display the information on the screen. Therefore, an application program written to operate with a certain GUI was limited to operating with only that GUI.

As an example, if an application program was written to execute with the OS/2 PRESENTATION MANAGER graphical user interface, it could not be executed on a computer running the WINDOWS graphical user interface since the API calls were different. Hence, application program vendors have had to supply different versions of their application program for each GUI. Take for example a typical application program, where a user has to choose between the DOS, WINDOWS or PRESENTATION MANAGER compatible version of the program.

In an attempt to resolve this problem, IBM introduced a version of OS/2 which allowed application programs written for GUIs other than PRESENTATION MANAGER to execute using the PRESENTATION MANAGER graphical user interface. This version was designated OS/2 Version 2.1 Special Edition and it allowed an application program, such as the word processing package Microsoft WORD 6.0 for WINDOWS, to be run on the PRESENTATION MANAGER GUI. This version of OS/2 also included the capability that multiple windows could be displayed on the screen simultaneously, wherein each window may contain information from applications written for different GUIs.

A problem with this earlier IBM approach was that it required that WINDOWS be loaded and resident in RAM. Therefore, in order to have the flexibility to run non-OS/2 based applications using the PRESENTATION MANAGER GUI, the user had to execute both WINDOWS and OS/2 PRESENTATION MANAGER. This was a costly solution since it required that the user have both OS/2 and WINDOWS resident and operating on the computer. In addition, this approach required a large amount of code. If a user was running several windows on the screen, each of the windows used the graphics engine associated with the graphical user interface with which the window was associated. As an example, if a user was running a first application program written to operate with MS WINDOWS and a second application program written to operate with OS/2 PRESEN- TATION MANAGER, then a first graphic engine compatible with MS WINDOWS would be required to write into the first window, and second graphic engine compatible with OS/2 PRESENTATION MANAGER would be required to write into the second window.

It would, therefore, be desirable to provide a common graphics subsystem which includes a GUI personality neutral graphics engine which services a variety of different GUI personalities running together on a single desktop.

SUMMARY OF THE INVENTION

An object of the present invention is to allow application programs written for different graphical user interfaces to be executed together on a single desktop.

Another object of the present invention is to provide a personality neutral graphics engine capable of interfacing with application programs written for various graphical programming interfaces.

Yet another object of the present invention is to provide a common graphical programming interface which allows application programs written for other graphical user interfaces, to be imported and seamlessly executed on a desktop controlled by the common graphical user interface.

Thus, in accordance with the present invention, a personality neutral graphics system resident in a computer operating system provides a personality neutral graphics interface between a graphical user interface and a graphics engine. The graphics system includes a common graphical user interface (CGUI) which receives graphics related application programming interface (API) calls from the application programs and transforms the various types of API calls native to a particular graphical user interface (GUI) into a format compatible with the personality neutral graphics interface. The transformed API calls are then passed from the CGUI to a personality neutral graphics engine that services the calls in cooperation with personality neutral device drivers thus allowing a single graphics engine to support the graphics needs for application programs which operate with different GUIs.

To handle the graphics API calls associated with the various types of GUIs supported by the CGUI, the CGUI includes a plurality of GUI specific graphic front-end interfaces, each associated with a particular type of GUI, such as OS/2 PRESENTATION MANAGER MS WINDOWS, X-WINDOWS™, etc. . . , and which each receive graphics API function calls from application programs written for that particular type of GUI. Each GUI specific graphic front-end interface receives the API call from a corresponding GUI and transforms the GUI specific personality neutral API calls.

The CGUI also includes a plurality of graphics back-end interfaces which are each associated with one of the GUI specific graphic front-end interfaces. Each graphic back-end interface converts the call received from the graphic front-end interface into a format compatible with the personality neutral graphics engine and passes the transformed calls onto the graphics engine. The graphics engine is personality neutral since the application programming interface between it and each of the plurality of windowing back-end interfaces is the same.

The present invention allows application programs written for a certain graphical user interface to operate on a computer running with a different graphical user interface. As an example, the PRESENTATION MANAGER GUI which runs on top of the OS/2 operating system may be modified to incorporate the personality neutral graphics system of the present invention so the resultant modified GUI can display information for various application programs written for other GUIs such as WINDOWS, X-WINDOWS, Macintosh or other known graphical user interfaces.

An advantage of the present invention is that users can now use a single graphical user interface and operating system to execute application programs written for different graphical user interfaces.

In addition, the architecture of the graphics management system reduces the code required to implement a personality neutral graphics system, and enhances the reuse of code in the system.

Another advantage of the present invention is, using a single graphics engine to support the graphics needs of multiple GUI personalities obviates the need for display and printer manufacturers to provide separate drivers for each GUI personality the device will operate with. The single graphics engine allows a single device driver to be used independent of the GUI the computer system is running.

These and other objects, features and advantages of the present invention will become more apparent in light of the following detailed description of a preferred embodiment thereof, as illustrated in the accompanying drawings.

DESCRIPTION OF THE PREFERRED EMBODIMENT

Figure 1:
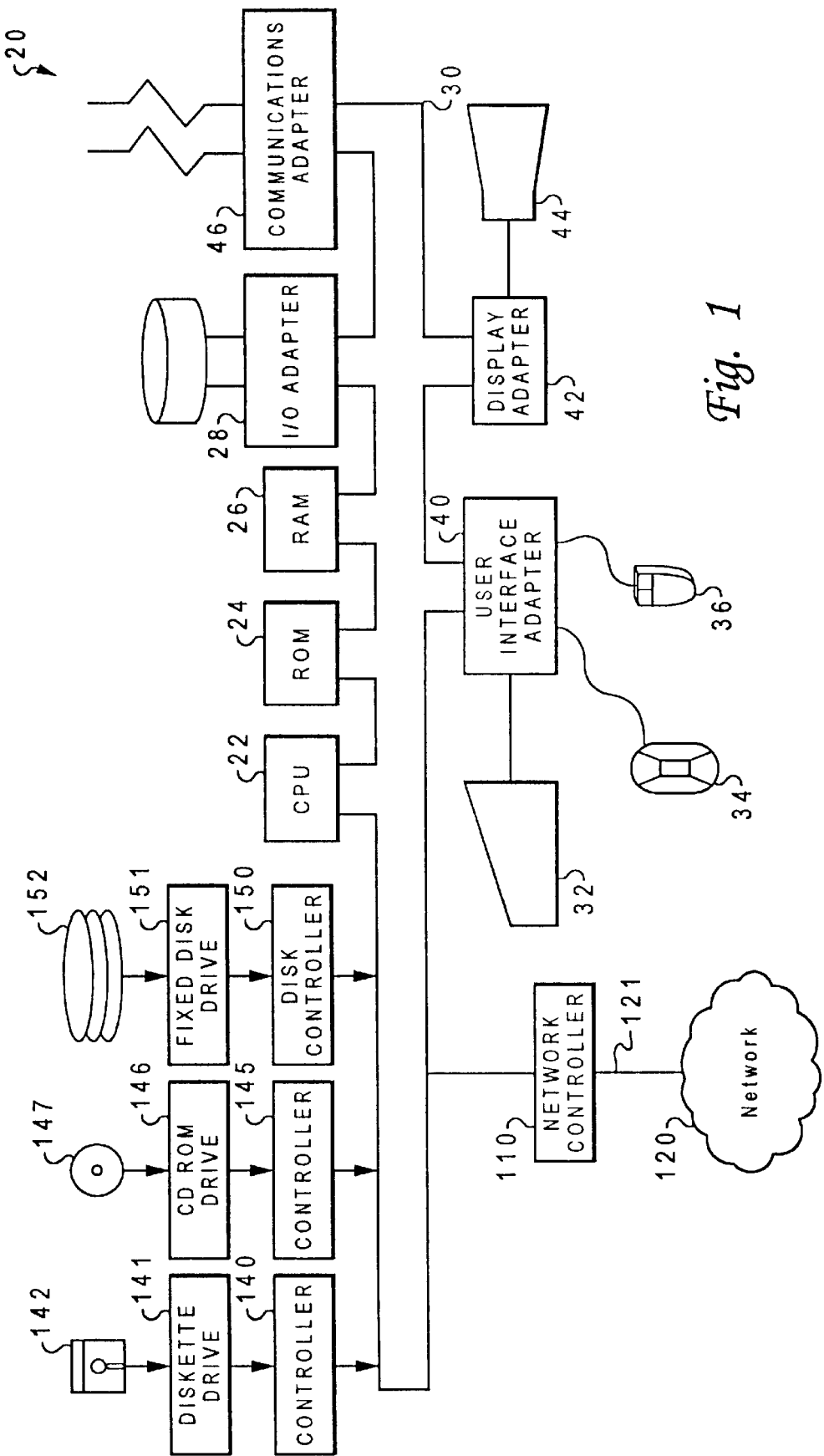
FIG. 1 is a block diagram of a personal computer system.

Referring now to FIG. 1, a personal computer system 20 includes a central processing unit (CPU) 22 (e.g., PENTIUM™, POWERPC™, etc. . . ), ROM 24, RAM 26, and an I/O adapter 28 which are all interconnected via a system bus 30. The system also includes a keyboard 32, trackball 34, mouse 36, and a speaker 38 which are interconnected in a well known manner to the bus 30 via a user interface adapter 40. To present information to the user, the system includes a display adapter 42 which may, for example, be provided as a super video graphics adapter (SVGA) card. Display adapter 42 receives commands and data to be displayed via the bus 30 and displays the data on a monitor 44 such as a CRT or a flat panel display. The system also includes a communications adapter 46 which allows the system to be interconnected to a LAN or WAN.

The computer system 20 executes a software operating system (e.g., OS/2) which in a well known manner provides centralized resource management for the CPU, memory, mass-storage devices, I/O devices such as the keyboard, display and mouse and the communication interfaces. The operating system generally includes a kernal, device driver routines and dynamic link libraries which with the application programs indirectly interact through a graphical user interface (GUI). The operating system may be provided, for example, as a multi-tasking operating system which allows views of several applications to be simultaneously displayed within their own window on the monitor 44.

In accordance with the present invention, computer system 20 includes a single graphical user interface (GUI) and operating system capable of executing application programs written for different graphical user interfaces. This allows users to adapt application programs written for various graphical user interfaces between different computer systems.

Figure 2:
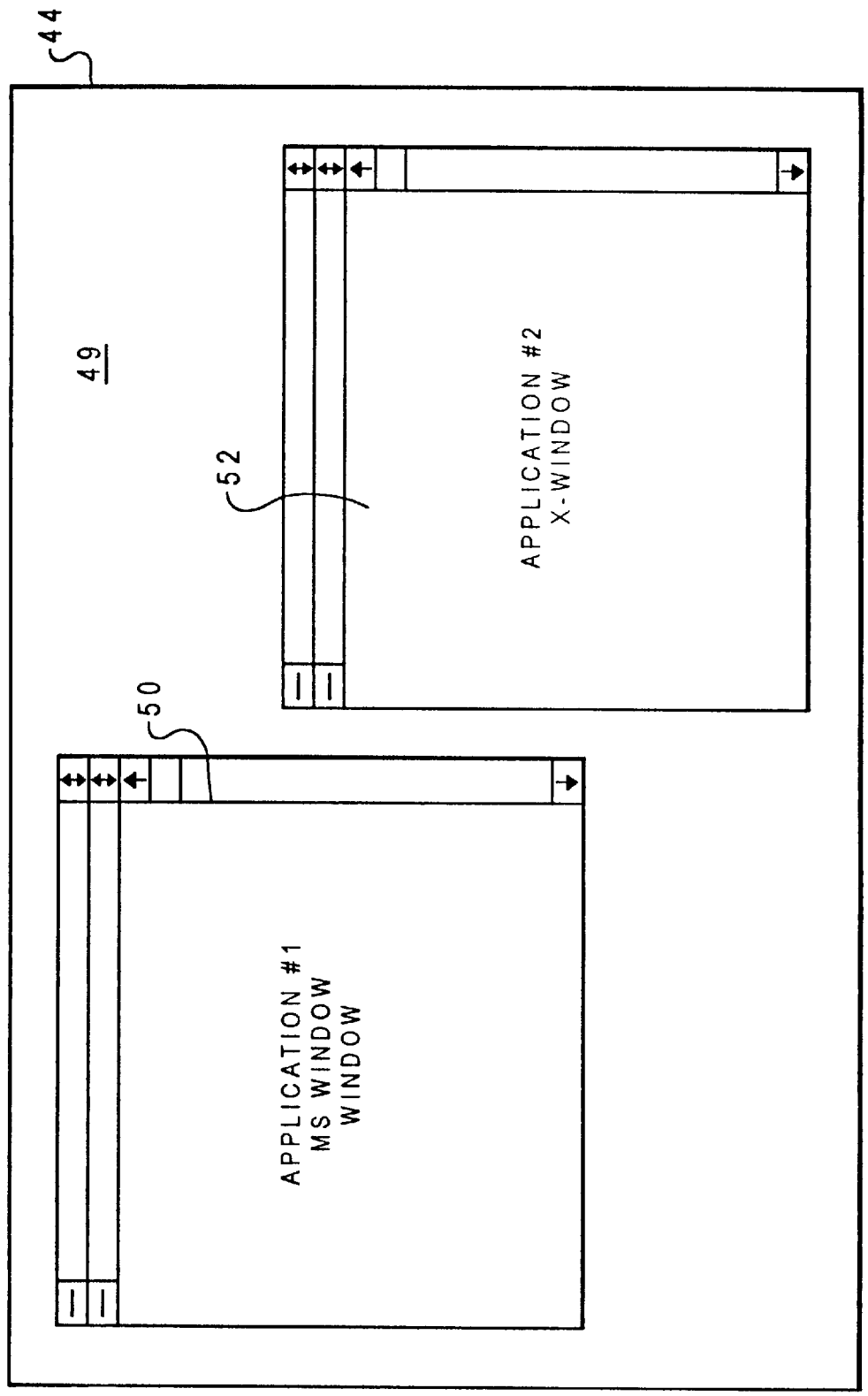
FIG. 2 is an pictorial illustration of multiple windows displayed on a viewing device using a single graphical user interface.

As an example, FIG. 2 illustrates a typical display screen 49 viewed on the monitor 44 (FIG. 1). In this particular example, display screen 49 includes two windows 50, 52. Each of the windows 50, 52 represent information from different application programs being executed by CPU 22 of computer system 20 (FIG. 1). The application program running within the first window 50 may be a word processing application written for the MS WINDOWS GUI, while the application program running within the second window 52 may be a spreadsheet application written for UNIX® based X-WINDOWS. Of course, many other applications are capable of being run in the windows 50,52, and those of ordinary skill in the art will recognize of course that more than two windows may be displayed on the display screen 49.

Figure 3:
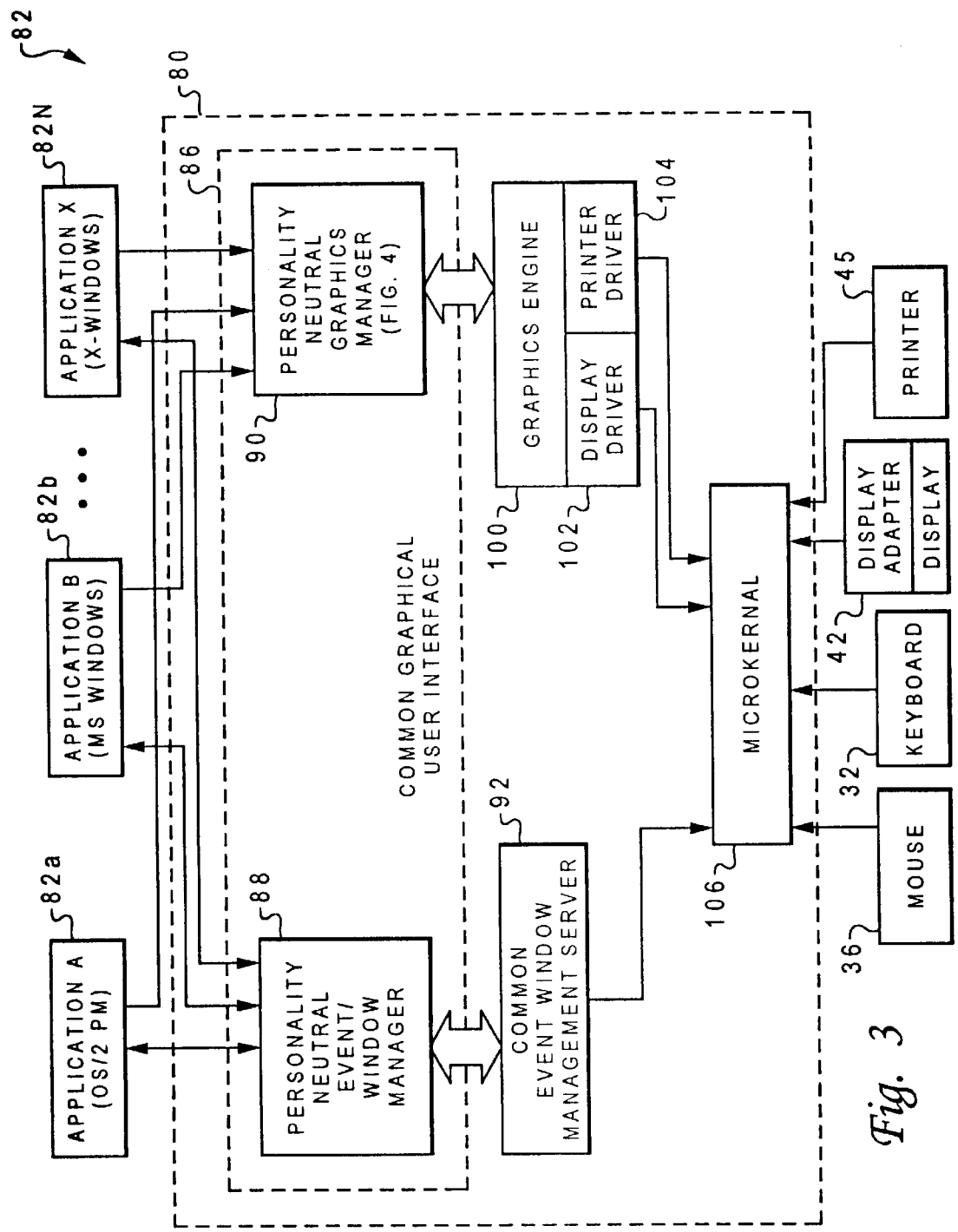
FIG. 3 is a functional block diagram of a personality neutral window/graphics system.

Referring now to FIG. 3, a personality neutral windowing/graphics system 80 which controls windows (e.g., windows 50,52 in FIG. 2) and information displayed within the windows on the display 44 is shown.

The personality neutral windowing/graphics system 80 receives graphics API function calls from a plurality of application programs generally denoted 82. The application programs 82 may include for example, a first application program 82a written for the OS/2 PRESENTATION MANAGER GUI while a second application program 82b may be written for the MS WINDOWS 3.1 based GUI. A third application program 82N being run by the computer system 20 may be written for the X-WINDOWS graphical user interface. Other application programs 82 which cooperate with particular GUIs may of course also operate with system 80. Thus, each of the application programs 82 cooperates with one of a plurality of different GUIs.

Application programs 82 issue API calls to perform a graphic function on display 42. Typical graphics API calls include calls to draw lines and circles and perform area fills within windows being shown on the computer display 42. Since each of the application programs 82 is compatible with a different GUI and each GUI has a different API call format, then each of the API calls provided by each of the different application programs 82 has a different API call format.

The graphic API calls are provided to a common graphical user interface (CGUI) 86. CGUI 86 receives the graphic API calls fed thereto and translates the different graphic API calls into a format compatible with a graphic engine 100. CGUI 86 also includes a personality neutral event/window manager 88 (PNEM) and a personality neutral graphics manager (PNGM) 90.

The personality neutral event window manager 88 receives windowing API function calls from each of the application programs 82, and creates, destroys, and processes the windowing related API calls. Such windowing API calls are provided having a format corresponding to the format of the GUI specific to the application program which originated the call. The event manager 88 then translates the GUI personality specific API call into a generic API call which is routed to a common event/window management server 92.

The details of the event/window manager 88 and the personality neutral windowing system are described in co-pending patent application entitled "Personality Neutral Window Management Subsystem" filed on even date herewith having named inventors Kenneth W. Borgendale, la M. Holland, Kelvin R. Lawrence, Colin W. Powell and Richard L. Verbug, identified as IBM attorney docket number BC9-94-134 assigned to the assignee of the present invention and incorporated herein by reference.

The personality neutral graphics manager 90 receives graphics API function calls native to a particular GUI and translates them into a generic graphic API call format. The translated calls are then passed to the graphics engine 100 which draws lines, circles, points, and generally controls the manner to which data is presented on display 45. The model for the translated API's may be X-WINDOWS APIs and the Gpi (graphics) functions from the OS/2 PRESENTATION MANAGER GUI.

Figure 4:
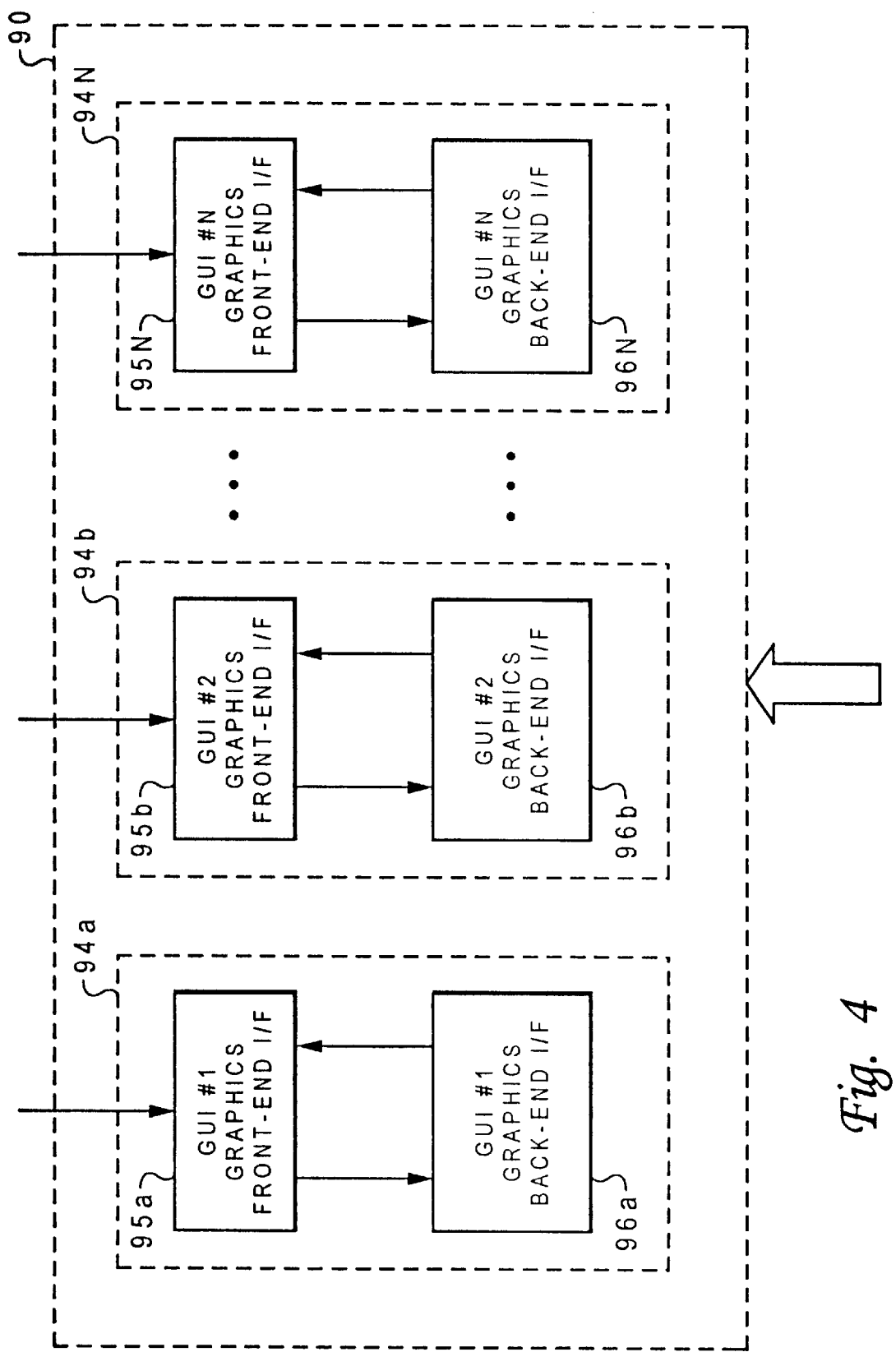
FIG. 4 is a more detailed functional block diagram of the personality neutral graphics manager shown in FIG. 3.

Referring briefly to FIG. 4, the personality neutral graphics manager 90 includes a plurality of personality specific GUI graphic routines 94a–94N generally denoted 94. Each of the personality specific GUI graphic routines 94 is associated with one of the GUIs which is supported by the CGUI 86 (FIG. 3). GUIs supported by the CGUI 86 may include OS/2 PRESENTATION MANAGER, MS WINDOWS, X-WINDOWS, Macintosh and other known GUIs. If the CGUI 86 was capable of executing application programs written for five different types of GUIs, CGUI 86 would include five personality specific GUI routines 94 for translation of GUI specific graphic API calls to a format compatible with graphics engine 100 (FIG. 3).

Each personality specific GUI graphics routine 94 includes a GUI specific graphics front-end interface 95a–95N generally denoted 95 which receives the personality specific graphical API calls from the application program(s) 82 (FIG. 3) and decodes the calls to determine the specific lower level calls necessary to perform the graphical tasks associated with the particular API call. The calls are then passed to a corresponding one of a plurality of GUI graphics back-ends 96a–96N generally denoted 96 which translates the GUI specific commands into personality neutral graphic API calls which are sent to the graphics engine 100.

Returning now to FIG. 3, graphics engine 100 corresponds to the drawing engine for the system and also manages display resources such as colormaps, bitmaps, etc. The engine 100 provides an interface between the graphics transportation protocols and presentation (e.g., display) and printer device drivers 102, 104. The graphics engine 100 also represents the funnel to the various pieces of hardware.

The engine 100 is provided as a single, extensible graphics engine and thus avoids problems in the prior art of arbitration access to the display. The engine 100 also provides all of the device-independent functions currently required to be implemented in presentation and printer device drivers, including full image rasterization.

It should be noted that the interface between each of the GUI graphics back-ends 96 and the graphics engine 100 is the same, and hence "personality neutral." That is, although the graphics commands provided to CGUI 86 are specific to a particular GUI graphics routine the graphics commands provided from the PNGM 90 to the graphics engine 100 are independent of the GUI for which the application program was written and thus may be referred to as personality neural. This technique allows a single, common graphics engine to provide the appropriate functions for each of the GUIs with which system 80 is compatible. Thus the personality neutral graphics engine 100 of the instant invention performs all the system drawing in a manner which is transparent to the application programs.

Prior art techniques, on the other hand, use multiple graphics engines each of which supports only one of the GUIs which the system can run.

The interface between the CGUI 86 and the graphics engine 100 should be preferably selected to have a high degree of commonality with existing GUIs such as PRESENTATION MANAGER, WINDOWS, X-WINDOWS and Macintosh. As such, a preferred graphics engine is the graphics engine used in the OS/2 2.1 operating system currently available from International Business Machines, the assignee of the present invention. This ensures that GUI developers who wish to modify their GUI to work with the common graphics engine will be able to retain some of the code from their current GUI design.

The graphics engine 100 translates the graphics API command and in a well known manner issues the appropriate commands to device drivers 102,104 associated with the particular type of display 44 and printer 45 connected to the computer system 20 (FIG. 1). Device drivers 102, 104 then issue hardware specific commands to an operating system microkernel 106 which provides the necessary commands to the display 44 and printer 45.

A feature of the architecture for the personality neutral graphics system of the present invention is that the graphics engine 100 is modular and both extensible and replaceable. That is, as more powerful graphics engines are developed, including 3-D graphics engines, those engines can be used as the graphic engine 100 and each of the back-end interfaces 96 would be modified to accommodate the change in graphics engines.

In an alternate embodiment, the invention may be implemented as a computer program product for use with a computer system. Such implementation may comprise a series of computer useable instructions either fixed on a tangible medium, such as a computer readable media, e.g. diskette 142, CD-ROM 147, ROM 24, or fixed disk 152 (FIG. 1), or transmittable to a computer system, via a modem or other interface device, such as network adapter 110 connector to the network 120 over a medium 121, which can be either a tangible medium, including but not limited to optical or analog communications lines, or use wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed from a server or electronic bulletin board over a network, e.g., the Internet or World Wide Web.

Although the present invention has been shown and described with respect to a best mode embodiment thereof, it should be understood by those skilled in the art that various other changes, omissions and additions to the form and detail thereof, may be made therein without departing from the spirit and scope of the invention.

What is claimed is:

1. A computer system for executing a plurality of different application programs, each of the application programs cooperative with one of a plurality of different graphical user interfaces, the computer system comprising;

a display;

a central processing unit for executing at least two of the plurality of different graphical user interfaces and for providing a window on said display for each of the at least two different graphical user interfaces;

a common graphical user interface for receiving a plurality of GUI personality specific graphics application programming interface (API) calls from the application programs, wherein said plurality of GUI API calls are each associated with a different GUI, and for translating each of the received different GUI personality specific graphics API calls into translated personality neutral graphics API calls;

a graphics engine coupled to said common graphical user interface, said graphics engine responsive to said translated graphics API calls, said graphics engine for controlling the drawing into each of the windows displayed on said display regardless of the GUI personality of the window; and a memory device for storing the application programs and said common graphical user interface.

2. The computer system of claim 1, wherein said common graphical user interface is provided having a personality specific GUI graphics routine for each of the plurality of GUIs capable of operating with said common graphical user interface.

3. The computer system of claim 2 wherein each of said plurality of personality specific GUI graphics routines comprises:

a GUI personality specific graphics front-end interface which receives API calls from the application programs having a native GUI associated with said GUI personality specific graphics front-end interface; and a GUI graphics back-end interface which receives and processes said translated graphics API calls to said translated graphics API calls.

4. A method for drawing on a computer display by a computer having a CPU and memory and which is capable of executing application programs written for several personality specific graphical user interfaces, the method comprising the steps of:

executing in the CPU a common graphical user interface which is resident in RAM, and which draws into the windows displayed on the computer display;

executing a plurality of application programs in the CPU wherein at least two of said plurality of application programs are native to different personality specific graphical user interfaces;

receiving at the common graphics user interface, GUI personality specific application programming interface (API) graphics calls from the application programs;

transforming said GUI personality specific graphic API calls from each of the application programs into personality neutral graphic API calls; and servicing each of the personality neutral graphics API calls in a single graphics engine.

5. The method of claim 4, wherein the step of servicing each of the personality neutral graphics API calls includes the step of issuing a command from the graphics engine to a device driver.

6. The method of claim 5 further comprising the step of issuing a hardware specific command from the device driver to an operating system microkernel.

7. The method of claim 6 further comprising the step of issuing a command from the operating system microkernel to a device.

8. A graphics system architecture for processing application programming interface calls received from a plurality of different application programs, each of the plurality of different application programs adapted to operate with one of a plurality of different graphical user interfaces, the graphics system architecture comprising:

a common graphical user interface having an application interface adapted to cooperate with each of the plurality of different application programs, said common graphical user interface comprising:

a personality neutral graphics manager having an input interface adapted to receive graphics application program interface calls from each of the plurality of application programs, each of the application program interface calls having one of a first plurality of different application program interface call formats and for translating each of the application program interface calls into a second application program interface call having a second format and for providing the second application program interface call having the second format at an output interface thereof; and a graphics engine having an input interface coupled to the output interface of said personality neutral graphics manager and having an output interface, said graphics engine for receiving the application program interface calls having the second application program interface call format provided thereto from said personality neutral graphics manager and for translating the application program interface calls and in response to each of the application program interface calls said graphics engine provides a corresponding command at the output interface thereof.

9. The graphics system architecture of claim 8 further comprising a device driver having an input interface coupled to the output interface of said graphics engine, said device driver for receiving the command provided at the output interface of said graphics engine.

10. The graphics system architecture of claim 9 further comprising a microkernel having an input interface coupled to said device driver and having an output interface adapted to couple to a device.

11. The graphics system architecture of claim 10 wherein said device driver corresponds to a first one of a display driver and a printer driver.

12. The graphics system architecture of claim 11 wherein said personality neutral graphics manager comprises:

a graphics front end interface, adapted to receive a graphical application program interface call from a particular one of the plurality of different graphical user interfaces and to decode the graphical application program interface call to determine a particular lower level call required to perform a graphical task defined by the graphical application program interface call; and a graphics back end interface coupled to the graphics front end interface for receiving the particular lower level call from said graphics front end interface and for translating a command defined by the lower level call into a personality neutral graphic application program interface call.

13. The graphics system architecture of claim 12 wherein said graphics back end interface provides the personality neutral graphic application program interface call to said device driver.

14. The graphics system architecture of claim 13 wherein said device driver issues hardware specific commands to said microkernel and said microkernel provides a corresponding command at an output port thereof.

15. A computer program product for user with a computer system having a display and executing a plurality of different application programs, each of the application programs operating in one of a plurality of different windows and cooperative with one of a plurality of different graphical user interfaces (GUIs), the computer program product comprising:

a computer usable medium having computer readable program code means for receiving a plurality of GUI personality specific graphics application programming interface (API) calls from the application programs said computer useable medium, wherein said plurality of GUI API calls are each associated with a different GUI further comprising;

computer readable program code means for translating each of the received different GUI personality specific graphics API calls into translated personality neutral graphics API calls; and computer readable program code means for controlling the drawing Into each of the windows displayed on said display regardless of the GUI personality of the windows.

16. The computer program product of claim 15 wherein said computer readable program code means for receiving a plurality of different GUI personality specific graphics application programming interface (API) calls comprises separate computer readable program code means for each of the plurality of GUIs capable of operating with the computer system, each of the separate computer readable program code means comprising:

computer readable program code means for receiving API calls from the application programs operating with a first native GUI;

computer readable program code means for decoding each of the API calls to determine the specific lower calls to perform a graphical task associated with each of the API calls; and computer readable program code means for translating specific lower level calls into personality neutral graphic API calls.

17. The computer program product of claim 16 wherein said computer useable medium further comprises computer readable program code means for passing the personality neutral graphic API calls to a graphic engine.

* * * * *